(12) United States Patent
Kuhlman et al.

(10) Patent No.: US 10,391,990 B2
(45) Date of Patent: Aug. 27, 2019

(54) VEHICLE BRAKING SYSTEM AND METHOD OF OPERATING THE SAME

(71) Applicant: Robert Bosch GmbH, Stuttgart (DE)

(72) Inventors: Ryan Kuhlman, Novi, MI (US); Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 15/852,543

(22) Filed: Dec. 22, 2017

(65) Prior Publication Data

US 2019/0193701 A1 Jun. 27, 2019

(51) Int. Cl.
*B60T 13/62* (2006.01)
*B60T 8/40* (2006.01)
*B60T 13/74* (2006.01)
*B60T 13/66* (2006.01)

(52) U.S. Cl.
CPC ............ *B60T 8/4086* (2013.01); *B60T 8/409* (2013.01); *B60T 13/662* (2013.01); *B60T 13/745* (2013.01); *B60T 2220/04* (2013.01)

(58) Field of Classification Search
CPC ...... B60T 8/4086; B60T 8/409; B60T 13/662; B60T 13/745
See application file for complete search history.

(56) References Cited

U.S. PATENT DOCUMENTS

| 4,776,643 | A | 10/1988 | Leiber | |
|---|---|---|---|---|
| 7,419,227 | B2 | 9/2008 | Marlhe et al. | |
| 8,662,601 | B2 | 3/2014 | Nakazawa | |
| 9,254,829 | B2 | 2/2016 | Jeon et al. | |
| 9,308,905 | B2* | 4/2016 | Biller | B60T 8/4081 |
| 9,452,744 | B2 | 9/2016 | Reuter | |
| 9,561,787 | B2* | 2/2017 | Quirant | B60T 13/662 |
| 9,656,646 | B2 | 5/2017 | Kim | |
| 10,137,877 | B2* | 11/2018 | Feigel | B60T 8/4081 |
| 2008/0051965 | A1 | 2/2008 | Nakamura | |
| 2008/0116740 | A1* | 5/2008 | Yokoyama | B60T 7/042 303/20 |
| 2012/0313427 | A1* | 12/2012 | Nishioka | B60T 7/042 303/10 |
| 2013/0241273 | A1 | 9/2013 | Kim | |

(Continued)

*Primary Examiner* — Vishal R Sahni
(74) *Attorney, Agent, or Firm* — Michael Best & Friedrich LLP

(57) ABSTRACT

A vehicle braking system includes a wheel cylinder, a master cylinder, a brake pedal operable to transmit a user input force to the master cylinder, a primary braking unit including a first electronically controlled pressure generating unit distinct from the master cylinder and operable to generate a braking force at the wheel cylinder in a first mode of operation, a secondary braking unit including a second electronically controlled pressure generating unit distinct from the master cylinder and operable to generate a braking force at the wheel cylinder in a second mode of operation and a pedal feel simulator operable to provide feedback to the brake pedal according to a fixed characteristic of the pedal feel simulator defining a predetermined force-stroke relationship relating a travel distance of the brake pedal to the user input force. In the first mode of operation, the secondary braking unit is operable to receive fluid from the master cylinder to diverge from the predetermined force-stroke relationship at the brake pedal.

20 Claims, 2 Drawing Sheets

FIG. 1

(56) References Cited

U.S. PATENT DOCUMENTS

2014/0110997 A1* 4/2014 Biller ................... B60T 8/4081
                                                      303/9.62
2014/0203626 A1* 7/2014 Biller ................... B60T 8/4081
                                                      303/10

* cited by examiner

US 10,391,990 B2

VEHICLE BRAKING SYSTEM AND METHOD OF OPERATING THE SAME

BACKGROUND

The present disclosure relates to vehicle braking systems. In particular, the invention relates to a vehicle braking system including a primary braking unit and a secondary braking unit.

SUMMARY

In one aspect, a vehicle braking system includes a wheel cylinder, a master cylinder, a brake pedal operable to transmit a user input force to the master cylinder, a primary braking unit including a first electronically controlled pressure generating unit distinct from the master cylinder and operable to generate a braking force at the wheel cylinder in a first mode of operation, a secondary braking unit including a second electronically controlled pressure generating unit distinct from the master cylinder and operable to generate a braking force at the wheel cylinder in a second mode of operation and a pedal feel simulator operable to provide feedback to the brake pedal according to a fixed characteristic of the pedal feel simulator defining a predetermined force-stroke relationship relating a travel distance of the brake pedal to the user input force. In the first mode of operation, the secondary braking unit is operable to receive fluid from the master cylinder to diverge from the predetermined force-stroke relationship at the brake pedal.

In another aspect, a method of operating a vehicle braking system includes depressing a brake pedal, electrically actuating a primary braking unit separate from a master cylinder to generate a braking force at a wheel cylinder, and delivering a feedback force to the brake pedal via a pedal feel simulator mounted downstream of the master cylinder. The feedback force is a function of the stroke of the brake pedal. The method further includes electrically actuating a secondary braking unit separate from the master cylinder and the primary braking unit to receive fluid from the master cylinder and diverge from the function defined by the pedal feel simulator. The electrical actuation of the secondary braking unit to receive fluid from the master cylinder does not modify the braking force at the wheel cylinder.

In yet another aspect, a vehicle braking system includes a wheel cylinder, a master cylinder, a brake pedal operable to transmit a user input to the master cylinder, a primary braking unit including an electronically controlled pressure generating unit distinct from the master cylinder and operable to generate a braking force at the wheel cylinder in a first mode of operation, an accumulator, a valve positioned between the master cylinder and the accumulator, a pedal feel simulator operable to provide a reaction force to the brake pedal based on a predetermined force-stroke relationship, and a controller operable to manipulate the valve in the first mode of operation to provide a force-stroke relationship different than the predetermined force-stroke relationship.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
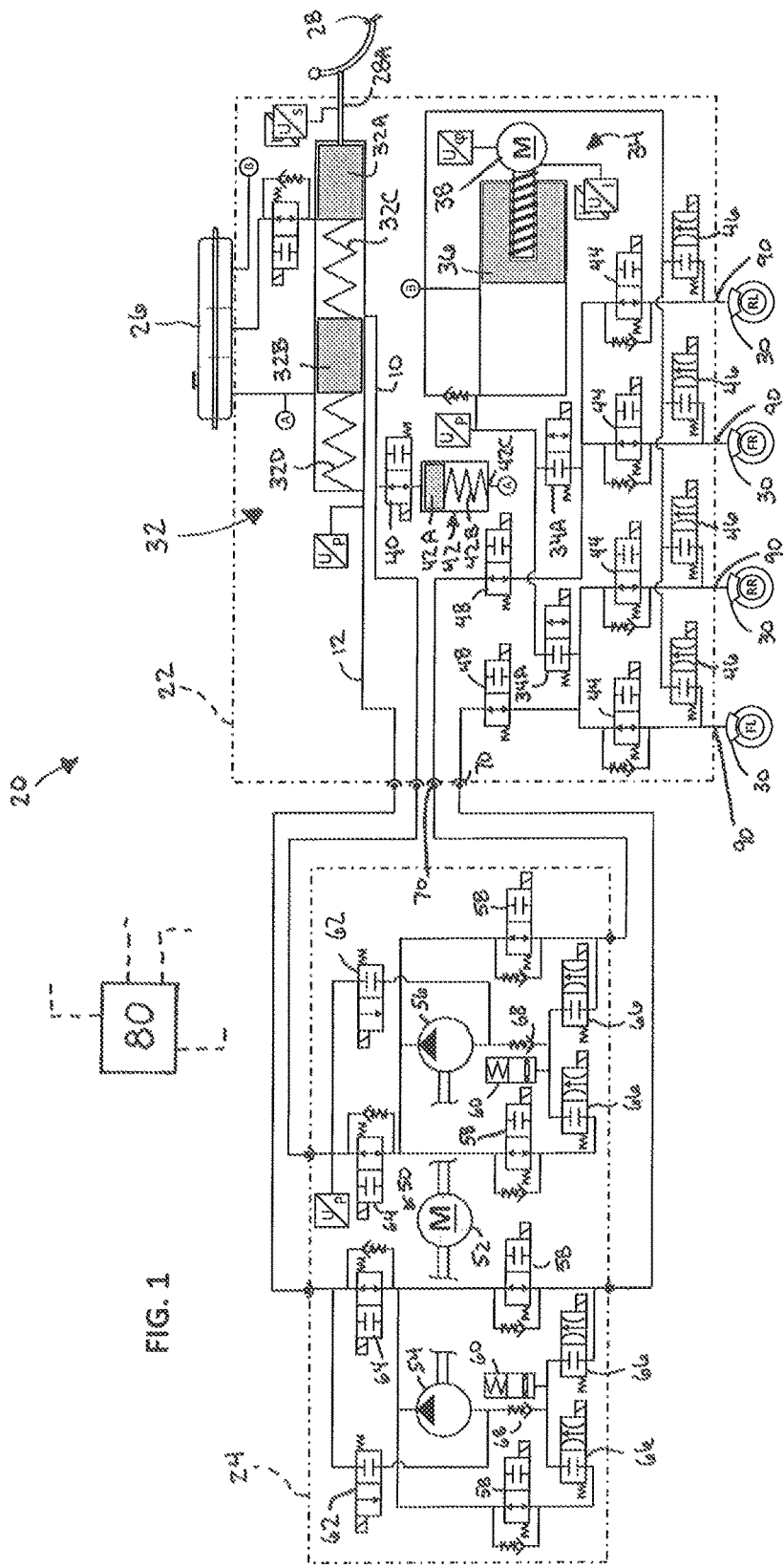
FIG. 1 is a schematic view of a vehicle braking system including a primary braking unit and a secondary braking unit.

FIG. 1 illustrates a vehicle braking system 20. The vehicle braking system 20 is a two-box braking system including a primary braking unit 22, a secondary braking unit 24, a fluid reservoir 26, a brake pedal 28, and a plurality of wheel cylinders 30 (as shown, the vehicle braking system includes four wheel cylinders 30) connected to the primary braking unit 22 at a plurality of outlet ports 90. The primary braking unit 22 is a single unit including inlet/outlet ports (e.g., ports 70, 90) for connection to, for example, the secondary braking unit 24, the wheel cylinders 30, and the reservoir 16. The primary braking unit 22 includes a master cylinder 32 in a direct relationship with the brake pedal 28 via an input rod 28A such that there is no brake booster between the master cylinder 32 and the brake pedal 28. Therefore, the brake pedal 28 actuates the master cylinder 32 directly through the input rod 28A. The master cylinder 32 is a tandem master cylinder with two master cylinder pistons 32A, 32B biased to unactuated positions by respective master cylinder springs 32C, 32D. The vehicle braking system 20 further includes two separate braking circuits 10, 12. Each braking circuit 10, 12 extends from a chamber associated with one of the master cylinder pistons 32A, 32B, through the primary braking unit 22, into and through the secondary braking unit 24, returning to the primary braking unit 22 via return ports 70 of the primary braking unit 22, and to two of the four wheel cylinders 30.

The primary braking unit 22 further includes an electronically controlled pressure generating unit 34 operable to increase the fluid output from the primary braking unit 22 to the wheel cylinders 30 in a brake-by-wire mode of operation. As shown, the electronically controlled pressure generating unit 34 is a plunger 36 driven by an electric motor 38 to pressurize the primary braking unit 22 and the wheel cylinders 30. Control valves 34A are configured to transition between an open position and a closed position and are operable to selectively separate the outlet of the plunger 36 from the wheel cylinders 30 in the closed position. The master cylinder 32 and electronically controlled pressure generating unit 34 are two fluid pressure suppliers. The vehicle braking system 20 includes a third fluid pressure supplier, motor-driven pumps, which will be explained in greater detail below.

The primary braking unit 22 further includes a pedal feel simulator 42. The simulator 42 is in selective communication with the master cylinder 32 to relay feedback to the brake pedal 28 proportional to the force supplied by the user to the brake pedal 28. The pedal feel simulator 42 includes a passive spring-biased plunger 42A that is biased to a first position via a spring 42B. In response to actuation of the master cylinder 32, the spring-biased plunger 42A is translated against the spring 42B, compressing the spring 42B at a rate based on a fixed characteristic, (i.e., the spring constant of the spring 42B). The simulator 42 further includes an outlet 42C on the rear side of the plunger 42A. The outlet 42C may be in direct communication with the reservoir 26 to provide reservoir pressure behind the plunger 42A and an escape route for displaced fluid. A simulator valve 40 is located upstream of the simulator 42 (i.e., between the master cylinder 32 and the simulator 42). The simulator valve 40 is a normally-closed switching valve and is configured to switch between an open position and a closed position to selectively permit a fluid passageway between the master cylinder 32 and the pedal feel simulator 42.

The primary braking unit 22 further includes a plurality of valves, specifically: separation valves 48, inlet valves 44 and outlet valves 46. The braking unit 22 includes a single separation valve 48 for each circuit 10, 12. The separation valves 48 separate the wheel cylinders 30 and the first electronically controlled pressure generating unit 34 from the secondary braking unit 24.

The primary braking unit 22 shown in FIG. 1 includes four inlet valves 44 and four outlet valves 46, one of each valve 44, 46 associated with each of the wheel cylinders 30. Each inlet valve 44 is located between a respective wheel cylinder 30 and the fluid pressure suppliers. Each outlet valve 46 is located between the respective wheel cylinder 30 and the reservoir 26. The inlet valves 44 are normally open control valves and the outlet valves 46 are normally closed control valves. The inlet and outlet valves 44, 46 are selectively manipulated (opened and closed to varying degrees via feedback from sensors, etc.) to control aspects of braking such as an anti-lock braking system (ABS), traction control, or an electronic stability program (ESP).

The secondary braking unit 24 includes a second electronically controlled pressure generating unit 50. The second pressure generating unit 50 includes a motor 52 operable to drive a plurality of pumps 54, 56. Each pump 54, 56 has an outlet side coupled to pressurize two of the wheel cylinders 30 (e.g., the first pump 54 pressurizes the front wheel cylinders 30 and the second pump 56 pressurizes the rear wheel cylinders 30). Alternatively, the first pump 54 may pressurize the front left wheel cylinder 30 and the rear right wheel cylinder 30 and the second pump 56 may pressurize the front right wheel cylinder 30 and the rear left wheel cylinder. Fluid for the pumps 54, 56 is drawn from the reservoir 26 through a high-pressure selector valve (HSV valve) 62 for each circuit 10, 12. If the pistons 32A, 32B of the master cylinder 32 block the fluid path between the reservoir 26 and the circuits 10, 12, the pumps 54, 56 draw fluid from the master cylinder 32. The driver may continue to move the brake pedal 28 because the pressure is dropping as fluid is pulled out of the master cylinder 32. Otherwise, the pressure within the master cylinder 32 will drop to the point that master cylinder seals (located around the pistons 32A, 32B; not shown) will deflect under a slight vacuum to allow fluid to flow past from the reservoir 26

An inlet valve 64 is located in parallel with each HSV valve 62. The inlet valves 64 are electronically controllable to maintain or modify a pressure differential across the inlet valves 64 by transitioning between a closed position and an open position (i.e., pulsation), and are operable to maintain a plurality of open positions therebetween (i.e., differential pressure control). When in an open position, each inlet valve 64 provides a fluid path from the master cylinder 32 to a switch-over valve 58.

The switch-over valves 58 are located within the secondary braking unit 24 and are biased open but are closeable to block a fluid path from the master cylinder 32 to the wheel cylinders 30. An outlet side of the switch-over valve 58 provides a fluid path to the wheel cylinders 30 (returning through the primary braking unit 22). FIG. 1 illustrates that the outlet of only two of the switch-over valves 58 connect directly back to the primary braking unit 22. Alternatively, the outlets of all four switch-over valves 58 may be in communication with the two return or inlet ports 70 of the primary braking unit 22. The outlet side of all or some of the switch-over valves 58 further provides a fluid path to an accumulator 60 via outlet valves 66.

The outlet valves 66 are positioned downstream of the switch-over valves 58 and are controllable between an open position and a closed position (i.e., pulsation), and are operable to maintain a plurality of open positions therebetween (i.e., differential pressure control). Further, the outlet valves 66 are electronically controllable to pulse between the open and closed positions to move fluid from the master cylinder 32, through the inlet and switch-over valves 64, 58 to the respective accumulator 60. Each pair of outlet valves 66 (i.e., associated with the two circuit 10, 12) is positioned upstream of the respective accumulator 60 with reference to a filling direction in which the accumulators 60 are being filled.

An accumulator 60 is associated with each of the first and second braking circuits 10, 12. Each accumulator 60 is configured to selectively receive fluid from the master cylinder 32 when the inlet valve 64, switch-over valve 58, and outlet valve 66 are in open positions to direct fluid from the master cylinder 32 to the accumulator 60. The accumulator 60 may additionally receive fluid from the inlet side of the respective pump 54, 56 via the check valve 68. Each accumulator 60 is further configured to store the fluid until electrically controlled to release or return the fluid.

The braking system 20 further includes a controller 80. The controller 80 may include a number of individual control units that function separately from one another. The controller 80 is programmed to receive signals from various sensors of the braking system 20. These sensors may include, for example, pressure sensors within the first and/or second circuits 10, 12 and pedal input sensors (e.g., pedal travel sensor, pedal pressure/force sensor, etc.) operable to measure an input to the brake pedal 28. The controller 80 is further operable to provide electrical signals to various components of the braking system 20 to actuate, for example, the motor 38 of the first electronically controlled pressure generating unit 34, the motor 52 of the second electronically controlled pressure generating unit 50, and the various valves 34A, 40, 44, 46, 48, 58, 62, 64, 66.

The braking system 20 is operable in two modes: a standard brake-by-wire mode and a back-up mode. In the standard brake-by-wire mode, a user provides an input to the brake pedal 28, displacing the master cylinder pistons 32A, 32B, and thereby displacing fluid from the master cylinder 32. In response to signals from a sensor (e.g., the pressure sensor, the pedal input sensor, etc.), the motor 38 of the electronically controlled pressure generating unit 34 is actuated to exert a drive force on the plunger 36, thereby pressurizing brake fluid to provide a braking force at the wheel cylinders 30. If anti-lock braking, traction control, or stability control are needed, the inlet and outlet valves 44, 46 are manipulated via the controller 80 to provide the requested control. The switch-over valves 58 (and/or the separation valves 48) are closed, thereby prohibiting fluid from the master cylinder 32 from directly influencing the wheel cylinders 30. The simulator valve 40 is open such that the pedal feel simulator 42 is in communication with the master cylinder 32 to provide feedback to the brake pedal 28 and to the operator.

The back-up mode is utilized when the operator provides an input to the brake pedal 28 and the first electronically controlled pressure generating unit 34 is incapable of providing a corresponding volume of fluid to the wheel cylinders 30. Such a scenario may occur, for example, if a sensor provides a signal outside of a predetermined range, or if the motor 38 is incapable of activating the plunger 36. Alternatively, the back-up mode may be utilized when there is no operator input (e.g., in automated braking, collision avoidance, etc.). The back-up mode may be a first back-up mode using hydraulic boost compensation, or a second "push-through" back-up mode.

In the first back-up mode, the master cylinder pistons 32A, 32B are displaced, thereby displacing fluid from the master cylinder 32. In response to signals from a sensor (e.g., the pressure sensor, the pedal input sensor, etc.), the HSV valves 62 are opened to move fluid from the master cylinder 32 to the inlet side of the pumps 54, 56. The controller 80 further actuates the motor 50 to run the pumps, moving the fluid through open switch-over valves 58, separation valves 48, and inlet valves 44, to the wheel cylinders 30. The control valves 34A are in the unactuated (i.e., biased) closed position as the first electronically controlled pressure generating unit 34 is not in use. The simulator valve 40 is closed to prevent fluid from reaching the pedal feel simulator 42.

In the event that the second electronically controlled pressure generating unit 50 is incapable of providing an adequate braking force to the wheel cylinders 30, the controller 80 may open the inlet valves 64 to establish a fluid path directly from the master cylinder 32 to provide a braking force at the wheel cylinders 30 through the switch-over valves 58 and separation valves 48 in the push-through back-up mode.

In the standard brake-by-wire mode of operation, there is a relationship between the stroke input (i.e., travel distance, offset distance) to the brake pedal 28 (and therefore also the stroke input to the input rod 28A and master cylinder pistons 32A, 32B) and the input force required to move the brake pedal 28 by that distance. There is also therefore a predetermined relationship relating the stroke input or travel distance of the brake pedal 28 to the reaction or feedback force provided by the pedal feel simulator 42. The pedal simulator 42 provides feedback to the brake pedal 28 according to a fixed characteristic of the pedal feel simulator 42. More specifically, when the simulator valve 40 is open (as it is in the standard brake-by-wire mode), a direct fluid path is provided between the master cylinder 32 and the pedal feel simulator 42. When the user moves the brake pedal 28 a first distance (e.g., the displacement of the input rod 28A as measured by a pedal input sensor), the master cylinder piston 32A translates a corresponding distance as a function of the first distance. Displacement of the piston 32A displaces an amount of fluid against the passive plunger 42A of the pedal feel simulator 42, thereby compressing the spring 42B. The compression of the spring 42B and the associated feedback force are dependent upon the spring constant (i.e., the fixed characteristic) of the spring 42B and the pressure applied by the master cylinder 32. In some constructions, no other factors determine the pedal feedback force. There is therefore a direct relationship between the input stroke of the brake pedal 28 and the feedback force from the pedal feel simulator 42. As the feedback force directly corresponds to the required input force to generate the pedal displacement, there is also a direct relationship between the input stroke of the brake pedal 28 and the input force generated at the brake pedal 28 by the user.

Various abnormalities or irregularities may arise within use of the vehicle braking system 20 in which the force applied at the wheel cylinders 30 is less than expected for a given actuation of the pressure generating unit 34 (e.g., outside a predetermined design range). For example, a leak in a fluid line upstream of one or more of the wheel cylinders 30 could decrease the applied braking force. Further, brake fade due to increased temperatures at the wheel cylinders 30 (and more specifically at the brake pads/disc), may lead to a gas build-up between wheel cylinder components, thereby decreasing the braking efficiency. Further still, a rear over-boost may occur in which the front wheel cylinders are utilizing anti-lock braking, but because of an increased load in the rear of the vehicle, the rear wheel cylinders 30 are not utilizing anti-lock braking, and could be provided with additional pressure. In any of these scenarios, with a conventional braking system, the user may be unaware of the braking values, inefficiencies, or irregularities during brake-by-wire braking with a pedal feel simulator having a fixed characteristic whereby the pedal feel simulator continues to provide passive feedback based on a predetermined force-stroke relationship.

In order to provide feedback to the user at the brake pedal 28 of a brake system value or irregularity, the secondary braking system 24 is operable to modify the force-stroke relationship of the brake pedal 28 by diverging from the predetermined force-stroke relationship normally provided solely by the pedal feel simulator 42. The secondary braking system 24 is operable when the braking system 20 is operated in the standard brake-by-wire mode. If a controller 80 receives a signal from a sensor indicative of an irregularity in the braking pressure applied to one or more of the wheel cylinders 30 (e.g., pressure leakage, an over-boost at some of the wheels, or brake fading, etc.), the controller 80 actuates various valves of the secondary braking system 24 to receive fluid from the master cylinder 32, thereby softening the pedal 28 (i.e., resulting in a pedal drop or increased pedal travel without an associated increase in input force) and modifying the force-stroke relationship of the brake pedal 28.

Figure 2:
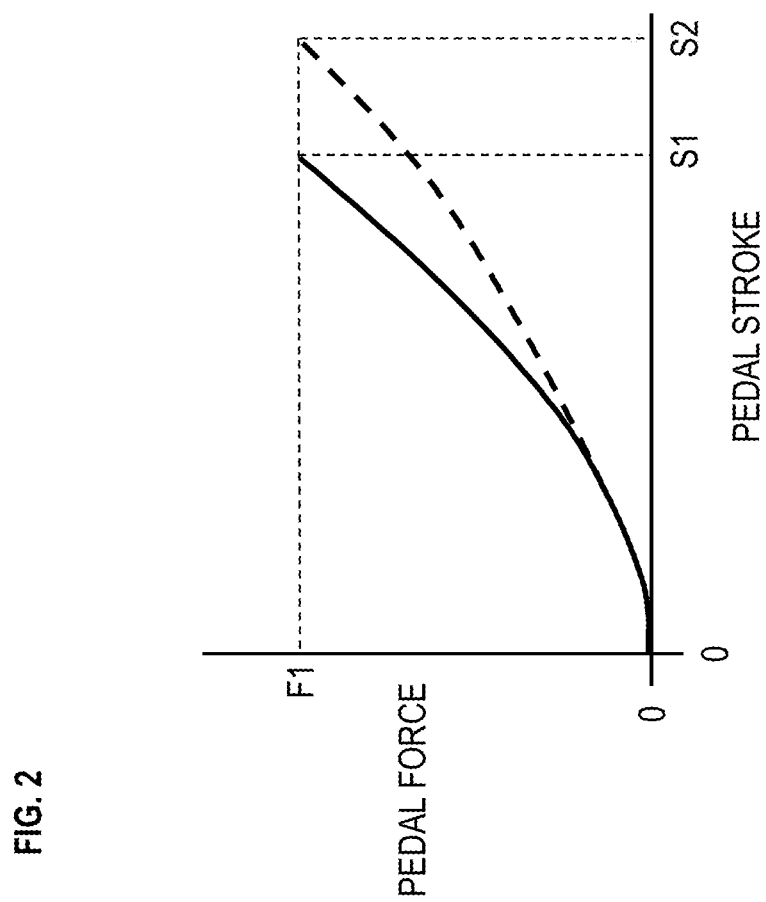
FIG. 2 is a graph illustrating a change in a force-stroke characteristic of the vehicle braking system of FIG. 1.

FIG. 2 illustrates a graph showing a modification to the force-stroke relationship in one scenario. As shown by the solid line, the force required to displace the pedal 28 from the unactuated position to a distance S1, is a force F1. By modifying the force-stroke relationship of the brake pedal 28 to soften the brake pedal, the force required to displace the pedal 28 from the unactuated position to a greater distance S2 (as illustrated by the dashed line) is the same force F1. In other words, when a user applies a force F1 to the brake pedal, softening the brake pedal 28 leads to an increased displacement (distance S2 greater than distance S1) of the brake pedal 28.

To modify the force-stroke relationship, the outlet valve 66 of the secondary braking unit 24 may be opened, and the inlet valve 64 may be controlled to selectively modify the pressure differential across the inlet valve 64 to move fluid from the master cylinder 32 to the accumulators 60. Alternatively, the inlet valve 64 of the secondary braking unit 24 may be opened and the outlet valve 66 is pulsed to move fluid into the accumulator. In either scenario, the separation valves 48 are closed to prevent the fluid movement within the secondary braking unit 24 from affecting the force applied to the wheel cylinders 30 via the primary braking unit 22. Moving fluid to the accumulators 60 provides a noticeable difference in the force-stroke relationship felt by the user at the brake pedal 28, thereby providing an indication of the irregularity in the braking system 20. Namely, with additional fluid evacuated from a previously closed system (between the master cylinder 32 and the pedal feel simulator 42), the master cylinder pistons 32A, 32B are capable of additional travel. In an alternative scenario, the secondary braking unit 24 may function as described above to increase the capabilities of an undersized master cylinder 32.

Upon release of the brake pedal 28, the controller evacuates the fluid from the accumulators 80. The pumps 54, 56 may be actuated to move the fluid back to the master cylinder 32 and/or the reservoir 26. Alternatively, the HSV valves 62 may be opened to return the fluid.

Though described above with reference to decreasing the force-stroke relationship (i.e. decreasing the feedback force associated with a pedal stroke input) via manipulation of the secondary braking unit 24, the secondary braking unit can likewise increase the force-stroke relationship. For example, if the pedal feel simulator 42 is stuck in an actuated position, the spring 42B is broken, or the simulator 42 is otherwise incapable providing a force feedback, the pumps 54, 56 can be used to move fluid against the master cylinder pistons 32A, 32B to mimic the functionality of the pedal feel simulator 42. Alternatively, fluid stored within the accumulators 60 can likewise be used to provide a feedback force at the master cylinder 32. The controller 80 operates the inlet and outlet valves 64, 66 (e.g. opening and closing, pulsing, etc.) to provide the appropriate feedback force and to permit removal of the fluid upon release of the braking pedal 28.

Various features of the disclosure are set forth in the following claims.

What is claimed is:

1. A vehicle braking system comprising:
   a wheel cylinder;
   a master cylinder;
   a brake pedal operable to transmit a user input force to the master cylinder;
   a primary braking unit including a first electronically controlled pressure generating unit distinct from the master cylinder and operable to generate a braking force at the wheel cylinder in a first mode of operation;
   a secondary braking unit including a second electronically controlled pressure generating unit distinct from the master cylinder and operable to generate a braking force at the wheel cylinder in a second mode of operation; and
   a pedal feel simulator operable to provide feedback to the brake pedal according to a fixed characteristic of the pedal feel simulator defining a predetermined force-stroke relationship relating a travel distance of the brake pedal to the user input force;
   wherein, in the first mode of operation, the braking force is generated by the primary braking unit without the aid of the secondary braking unit, and the secondary braking unit is contemporaneously operable to receive fluid from the master cylinder to diverge from the predetermined force-stroke relationship at the brake pedal.

2. The vehicle braking system of claim 1, wherein the pedal feel simulator includes a spring-biased plunger defining the fixed characteristic, the vehicle braking system further comprising a simulator valve positioned between the pedal feel simulator and the master cylinder.

3. The vehicle braking system of claim 1, wherein the vehicle braking system does not include a brake booster between the brake pedal and the master cylinder such that the brake pedal actuates the master cylinder directly.

4. The vehicle braking system of claim 1, wherein the second electronically controlled pressure generating unit includes a pump operable to draw fluid from a reservoir and supply pressurized fluid to the wheel cylinder in the second mode of operation.

5. The vehicle braking system of claim 1, further comprising a controller and a sensor operable to provide a signal to the controller indicative of a brake system value, wherein, in the first mode of operation, the controller is operable in response to the signal from the controller to operate the second braking unit to provide increased brake pedal travel compared to the predetermined force-stroke relationship.

6. The vehicle braking system of claim 5, wherein the signal is indicative of one or more of a brake fade threshold value, a rear over-boost threshold value, or a pressure leak threshold value.

7. The vehicle braking system of claim 1, further comprising a controller and a sensor operable to provide a signal to the controller, wherein, in the first mode of operation, the controller is operable to actuate the secondary braking unit to reduce the force-stroke relationship such that the brake pedal is softened.

8. The vehicle braking system of claim 1, wherein the secondary braking unit further comprises an inlet valve upstream of the second electronically controlled pressure generating unit, and wherein, in the first mode of operation, the inlet valve is operable via differential pressure control to adjust the force-stroke relationship between the brake pedal the master cylinder.

9. The vehicle braking system of claim 1, wherein the secondary braking unit further comprises an outlet valve downstream of the second electronically controlled pressure generating unit, and wherein, in the first mode of operation, the outlet valve is operable via a pulsing control to adjust the force-stroke relationship between the brake pedal the master cylinder.

10. A method of operating a vehicle braking system, the method comprising:
    depressing a brake pedal;
    electrically actuating a primary braking unit separate from a master cylinder to generate a braking force at a wheel cylinder;
    delivering a feedback force to the brake pedal via a pedal feel simulator mounted downstream of the master cylinder, the feedback force a function of the stroke of the brake pedal; and
    contemporaneous with the actuation of the primary braking unit to generate the braking force at the wheel cylinder, electrically actuating a secondary braking unit separate from the master cylinder and the primary braking unit to receive fluid from the master cylinder and diverge from the function defined by the pedal feel simulator,
    wherein the electrical actuation of the secondary braking unit to receive fluid from the master cylinder does not modify the braking force at the wheel cylinder, which braking force is generated by the primary braking unit without the aid of the secondary braking unit.

11. The method of claim 10, wherein diverging from the function includes increasing or decreasing the feedback force provided to the brake pedal in response to a stroke distance of the brake pedal.

12. The method of claim 10, further comprising detecting a brake system value in the vehicle braking system, and relaying a signal indicative of the brake system value to a controller, wherein the secondary braking unit is electrically actuated to accept fluid from the master cylinder via the controller in response to the signal.

13. The method of claim 10, wherein the secondary braking unit is hydraulically connected to the master cylinder via an inlet valve, wherein electrically actuating the secondary braking unit to diverge from the function includes manipulating the inlet valve via differential pressure control to bleed fluid from the master cylinder to the secondary braking unit.

14. The method of claim 10, wherein the secondary braking unit is hydraulically connected to the wheel cylinders via an outlet valve, wherein electrically actuating the secondary braking unit to diverge from the function includes manipulating the outlet valve via a pulsing control to adjust the force-stroke relationship between the brake pedal and the master cylinder.

15. The method of claim 10, wherein the secondary braking unit includes an accumulator, and wherein electrically actuating the secondary braking unit includes directing fluid from the master cylinder to the accumulator.

16. A vehicle braking system comprising:
a wheel cylinder;
a master cylinder;
a brake pedal operable to transmit a user input to the master cylinder;
a primary braking unit comprising an electronically controlled pressure generating unit distinct from the master cylinder and operable to generate a braking force at the wheel cylinder in a first mode of operation;
an accumulator;
a valve positioned between the master cylinder and the accumulator;
a pedal feel simulator operable to provide a reaction force to the brake pedal based on a predetermined force-stroke relationship; and
a controller operable to manipulate the valve in the first mode of operation to establish fluid communication between the master cylinder and the accumulator to provide a force-stroke relationship different than the predetermined force-stroke relationship, wherein during the first mode of operation the accumulator remains isolated from the wheel cylinder so as not to affect the braking force provided by the primary braking unit.

17. The vehicle braking system of claim 16, wherein the pedal feel simulator includes a spring-biased plunger, and the predetermined force-stroke relationship is defined by a spring constant of the spring-biased plunger.

18. The vehicle braking system of claim 16, wherein the valve is a first valve and further comprising a second valve, and wherein the controller is operable, in the first mode of operation, to manipulate the second valve to disconnect the primary braking unit from the secondary braking unit.

19. The vehicle braking system of claim 16, further comprising a secondary braking unit comprising a pump distinct from the master cylinder and operable to generate a braking force at the wheel cylinder in a second mode of operation, wherein the secondary braking unit further includes the accumulator and the valve.

20. The vehicle braking system of claim 16, further comprising an input sensor configured to measure a driver input to the brake pedal, wherein the force-stroke relationship is defined such that a change of the driver input results in a change to the reaction force produced by the pedal feel simulator.

* * * * *